July 25, 1939.　　　J. W. LEARY　　　2,167,215
SPONGE RUBBER ROLLER AND METHOD OF MAKING THE SAME
Filed April 24, 1937
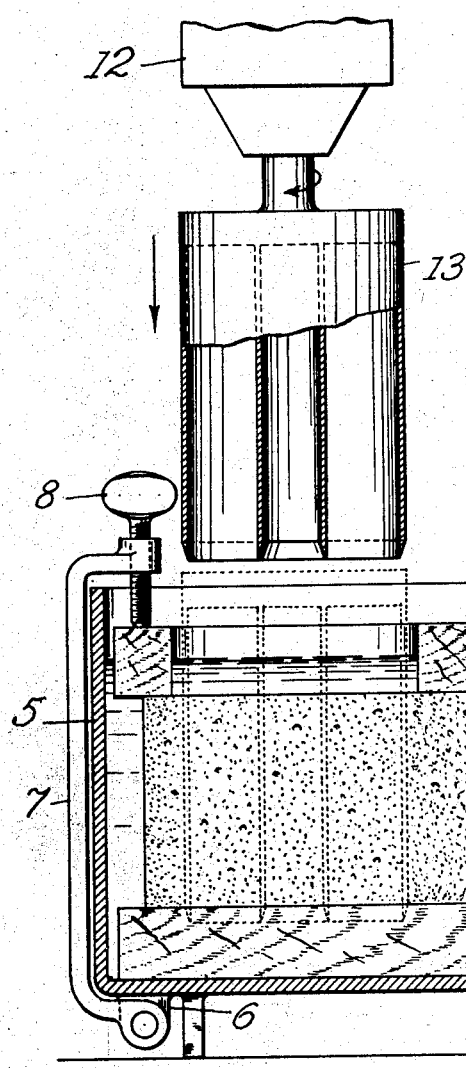
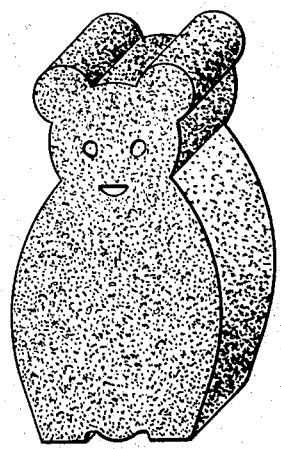
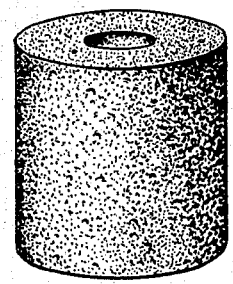
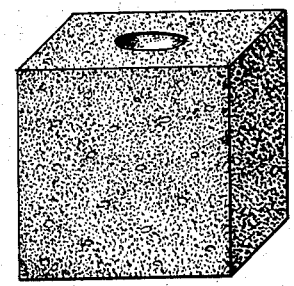
INVENTOR
James W. Leary
BY George S. Hastings
ATTORNEY Patented July 25, 1939

2,167,215

UNITED STATES PATENT OFFICE 2,167,215

SPONGE RUBBER ROLLER AND METHOD OF MAKING THE SAME

James W. Leary, Bloomfield, N. J., assignor to American Machine & Foundry Company, a corporation of New Jersey Application April 24, 1937, Serial No. 138,719

4 Claims. (Cl. 164—17)

The successful fabrication of soft spongy or cellular material such as sponge rubber, crepe rubber, sponge, felt and like substances into articles of various sizes and shapes, presents many difficulties due to the fact that its general nature makes it extremely difficult to maintain in its natural state while working it. At the present time most articles made from these materials and sold generally have irregularities on their surfaces or unevenness in form due to distortion when being shaped. This results from the elastic and cellular structure of these materials which causes them to collapse, and distort whenever any shaping tool is brought into contact therewith for forming articles of desired configuration and dimensions.

In many branches of industry there is a need for accurately shaped soft elastic porous articles formed from the materials noted above, and it is an object of this invention to provide a novel method of and means for handling these materials in order to produce articles which are more perfect in size, shape and form than heretofore producible. For instance, articles produced from these materials may take the form of symmetrical elastic rollers for paper feeding, cigarette, packaging and printing machines or as parts in many other devices. Also, these materials, according to the invention, may be made up into artistic forms, toys, etc., with the elimination of all distortion and irregularities which have hitherto generally characterized articles of this kind.

It is a further object to provide a method of and means for working compressible porous materials, such as crepe and sponge rubber by causing the material being treated to assume a rigid character so that articles of predetermined shape may be formed therefrom and be free of visible distortions and irregularities.

It is an added object to provide a method of and apparatus for freezing spongy materials having an elastic cellular structure for example, sponge rubber, in order to impart thereto such temporary rigidity that articles of various sizes and shapes may be cut therefrom.

It is a further object of the invention to provide a process which will allow soft, elastic porous materials such as sponge, sponge rubber and other like substances to be readily worked and not be distorted or otherwise contorted out of shape during its working whereby articles of predetermined sizes and shapes may be formed therefrom.

It is a further object of the invention to produce articles from soft, elastic cellular material such as crepe or sponge rubber having accurate predetermined shapes free from irregularities and distortions usually encountered in fabricating such material.

The invention also contemplates the formation of objects of predetermined size, shape and dimension from elastic porous material such as sponge or crepe rubber having a durometric rating ranging below ten, and also to articles formed from this material when it has a rating on the durometric scale of less than zero which makes it extremely difficult to fabricate the desired shapes accurately.

With these and other objects not specifically mentioned in view, the invention consists in certain combinations and constructions which will be hereinafter fully described, and then specifically set forth in the claims hereunto appended.

In the accompanying drawing which forms a part of this specification, and in which like characters of reference indicate the same or like parts:

Fig. 1 is an elevation showing the arrangement of the apparatus for applying the improved method; and Figs. 2, 3 and 4 are views showing several types of finished articles.

Referring to Fig. 1, which shows one manner of performing my invention, the block A of sponge rubber, felt, or any soft, porous material is placed in a container 5 provided with lugs 6 to which are hinged brackets 7 carrying thumb screws 8. A clamp board 9 is placed on the bottom of container 5 before inserting the block A of material to be processed, and a second clamp board 10 is laid on top of the block, the latter board having one or more apertures 11 which provide for admission of the cutting tool. It has been found that care must be taken to prevent compression of the material before freezing inasmuch as irregular and distorted objects will result if any part of the material is not properly supported for freezing since in expanding after freezing the irregularities become apparent. After squaring up, the brackets 7 are raised into position and the screws 8 are tightened until they bear lightly on board 10, thereby clamping the block A in place. The container 5 is then filled with water to a height sufficient to fully cover the block A, the clamping of the screws 8 both positioning and preventing the block and the boards from floating. It is also to be noted that in order to freeze the material uniformly all or substantially all air held therein must be removed before freezing in order that all cells can be filled with the water or other fluid used. This can be effected by pressing the material several times and allowing it to absorb as much fluid as possible.

The container so prepared is then exposed to a temperature well below the freezing point, preferably by putting it into the freezing unit of a mechanical refrigerator, until its contents is frozen into a solid mass. The frozen mass is then ready for further processing. It has been found that a punch press serves very well in forming the desired sections, and in the embodiment shown the chuck carries a rotating punch 13 of the given shape and dimensions. This punch which may have either a knife edge as shown, or a saw edge, enters one of the openings 11 of top board 10, passes through the frozen block A and comes to rest on the bottom board 9.

On withdrawing the punch, a roller such as shown in Fig. 2, is obtained which after thawing is found to be true as to shape, squareness of faces and to position and size of hole.

While this invention is readily adaptable for shaping any of the mentioned types of porous materials, it has provided to be of great value in the successful fabrication of articles from very soft grades of sponge and crepe rubber from the hardness of ten and below on the durometric standard. Thus, material which is below zero on the durometric scale, and is always extremely difficult to fabricate can now be formed to any shape practically, rapidly and efficiently.

Other shapes, such as those shown in Figs. 3 and 4, can be produced in the same manner by employing proper cutting tools such as jig saws, band saws or punches suitably shaped for the purpose in hand.

The various means referred to may be varied in construction within the scope of the claims for the particular device selected to illustrate the invention is but one of the many possible concrete embodiments of the same. The invention is not, therefore, to be restricted to the precise details of the structure shown and described.

What is claimed is:

1. The method of forming a symmetrical cylindrical roller from sponge rubber for use in the feeding mechanism of a cigarette machine, said sponge rubber being characterized by a multiplicity of irregular voids throughout its mass, defined by delicate walls highly compressible and resilient, the method consisting in submerging the unformed mass of sponge rubber in water to form a frozen body of water extending within the cellular voids, embracing and supporting said delicate walls against deformation by compression, and finishing, with ordinary machine tools, from said frozen mass an elongated cylindrical solid having an axial bore, while said cellular material is so interpenetrated, with said walls embraced and supported by said frozen body, and melting said frozen body, leaving said sponge rubber in the form of a truly cylindrical roll.

2. The method as in claim 1, which comprises the steps of compressing said material to eject substantially all the air contained therein, placing said compressed material in water and allowing said material to expand, freezing the body of water in which said mass has been so immersed and expanded, and cutting the said roll from the frozen block constituted by the frozen body of water and included sponge rubber, then removing the frozen cylinder from the matrix, and allowing the roll to thaw out and dry.

3. As a new article of manufacture, a product prepared in accordance with the method of claim 1.

4. As a new article of manufacture, a product prepared in accordance with the method of claim 2.

JAMES W. LEARY.